(12) United States Patent
Krtolica et al.

(10) Patent No.: US 7,360,243 B2
(45) Date of Patent: Apr. 15, 2008

(54) STANDARD BASED FIREWALL ADAPTER FOR COMMUNICATION SYSTEMS AND METHOD

(75) Inventors: Nenad Krtolica, San Jose, CA (US); Dalibor Kukoleca, San Jose, CA (US)

(73) Assignee: Adria Comm LLC, San Jose, CA (US)

( * ) Notice: Subject to any disclaimer, the term of this patent is extended or adjusted under 35 U.S.C. 154(b) by 742 days.

(21) Appl. No.: 10/676,174

(22) Filed: Oct. 2, 2003

(65) Prior Publication Data

US 2005/0076234 A1    Apr. 7, 2005

(51) Int. Cl.
*G06F 17/00* (2006.01)
(52) U.S. Cl. .................... 726/11; 726/12; 726/13; 726/15; 713/100; 713/160
(58) Field of Classification Search ................ 726/11, 726/13, 15, 12; 713/100, 160
See application file for complete search history.

(56) References Cited

U.S. PATENT DOCUMENTS

2004/0059942 A1*   3/2004   Xie ........................... 713/201

* cited by examiner

*Primary Examiner*—Ellen Tran
(74) *Attorney, Agent, or Firm*—Paul Hentzel (57) ABSTRACT

System 10 distributes information data packets 10D from multiple send endpoint ports 11S in send endpoint unit 12S, to multiple receive endpoint ports 11R in receive endpoint unit 12R. The packets pass through standard based send firewall adapter 14S (shown in detail in FIG. 3), traverse at least one firewall 15W through selected port 15P, and pass through standard based receive firewall adapter 14R. The endpoint units in the send and receive stations may be simple PCs operated by individuals at a single work station, or complex computer system(s) operated by large organizations.

20 Claims, 5 Drawing Sheets

STANDARD BASED FIREWALL ADAPTER FOR COMMUNICATION SYSTEMS AND METHOD

TECHNICAL FIELD

This invention relates to routing voice/video/data communications through network firewalls, and more particularly to such routing through determined network ports with minimal security risk.

BACKGROUND

Heretofore, security firewalls interfered with smooth exchange of voice/video/data information over communication networks such as the internet. This difficulty could be overcome by temporarily reducing or removing firewall protection. Firewalls are established and maintained by residual local software and hardware to prevent unauthorized entry into the host system and unauthorized access to host hardware, software, database, and other resources. They are typically provided between a host computer (endpoint unit) and the outside world, especially the internet. However, firewalls may also be intra-organizational within a LAN (local area network) between a protected host database and other departments of a host organization. Without firewalls, casual hackers and other intruders may enter the host by various means including uncovering a password and logging-in as a legitimate user, Trojan Horse tactics, e-mail techniques, an open port, and other low-level strategies. Understandably, serious organizations are reluctant to reduce firewall security.

Instead of reducing firewall protection, costly standard based communication tools such as routers and servers were installed to support a smooth internet exchange. Standard based communication tools were selected from a pool of twenty or so commonly used, commercially available, compatible software and hardware, which fully comply with industry standard header configurations. Typical users had several of these standard based endpoint units residing locally on their host systems. These standard based units were used in conjunction with standard aware software and hardware, which merely recognizes the industry standard for controlling the flow of data packets and operating the standard based endpoint units. Currently the three major standard ITU (international telecommunication union) configurations are H323, SIP, and T120. Voice and videos units generally include programs based on H323 or and SIP. Data transfer units (white board applications, file transfers, etc.), are generally T120 based. Each configuration is subject to a particular header protocol of delivery and communication rules and procedures.

Users on either side of the firewall(s) needed compatible, standard based-equipment, which is typically complex, requiring an on-site, network security administrator to set-up and maintain. The firewall router were be located at any entry point into the protected LAN such as before first server, before the front end router, or before the modem end router. The desired seamless communication requires multiple firewall ports in the firewall which are serially opened one at a time. The data packet stream forms a communication which crosses the firewall through a series of different ports. For security reasons, each next-to-open-port in the series is selected at random from an available port population of 65,511 out of a total port population of 65,535. The number of ports is defined by the standard based operating system.

SUMMARY

It is therefore an object of this invention to provide a standard based firewall adapter for a communication system between a send endpoint(s) and a receiving endpoint(s). This standard based firewall adapter has computer hardware and software which permit multiplexed tunneling at a specified port. The adapter is compatible with older firewalls and the newer standard aware firewalls; The adapter is also compatible with older endpoint units and standard based endpoint units. The endpoint client may continue to use older user friendly, off-the-shelf, low priced hardware and software, after installing the standard based firewall adapter. Neither the send client nor the receiving client needs to install any new costly standard based components or software or review any new operating manuals for complex standard based routers and servers. An expensive upgrade to a standard based system is not required.

It is another object of this invention to provide such a standard based firewall adapter which is "portable", having universal application with various operating systems. The send party's endpoint computer and endpoint operating system may be different from the receiving party's computer and operating system, and even incompatible therewith. The firewall adapter functions as an adapter or buffer between the endpoint client and the network. The endpoint sees the adapter as a fully compatible interface with the network; and the network sees the adapter as a standard based endpoint. This isolation between the endpoint and the network minimizes interface problems with routers etc. The buffer feature of the adapter increases compatibility between adapter even though the adapters are not identical.

It is another object of this invention to provide such a standard based firewall adapter which maintains high security by employing a single, determined port in a customized set-up configuration. By convention, port 80 is the default port, and is open to heavy web traffic from browsers and web servers. The adapter may open a non-default port exclusively for selected traffic, or employ a single customized set-up port.

It is another object of this invention to provide such a standard based adapter in which software for supporting various industry standard header configurations may be readily added or deleted. A user may easily expand the protocol stack to support additional standard based configurations and newly created configurations. The user may delete antiquated or unused configurations.

BRIEF DESCRIPTION OF THE DRAWING

Further objects and advantages of the present system and standard based firewall adapter will become apparent from the following detailed description and drawing in which.

REFERENCE NUMERALS IN DRAWINGS

The table below lists the reference numerals employed in the figures, and identifies the element designated by each numeral.

Figure 1:
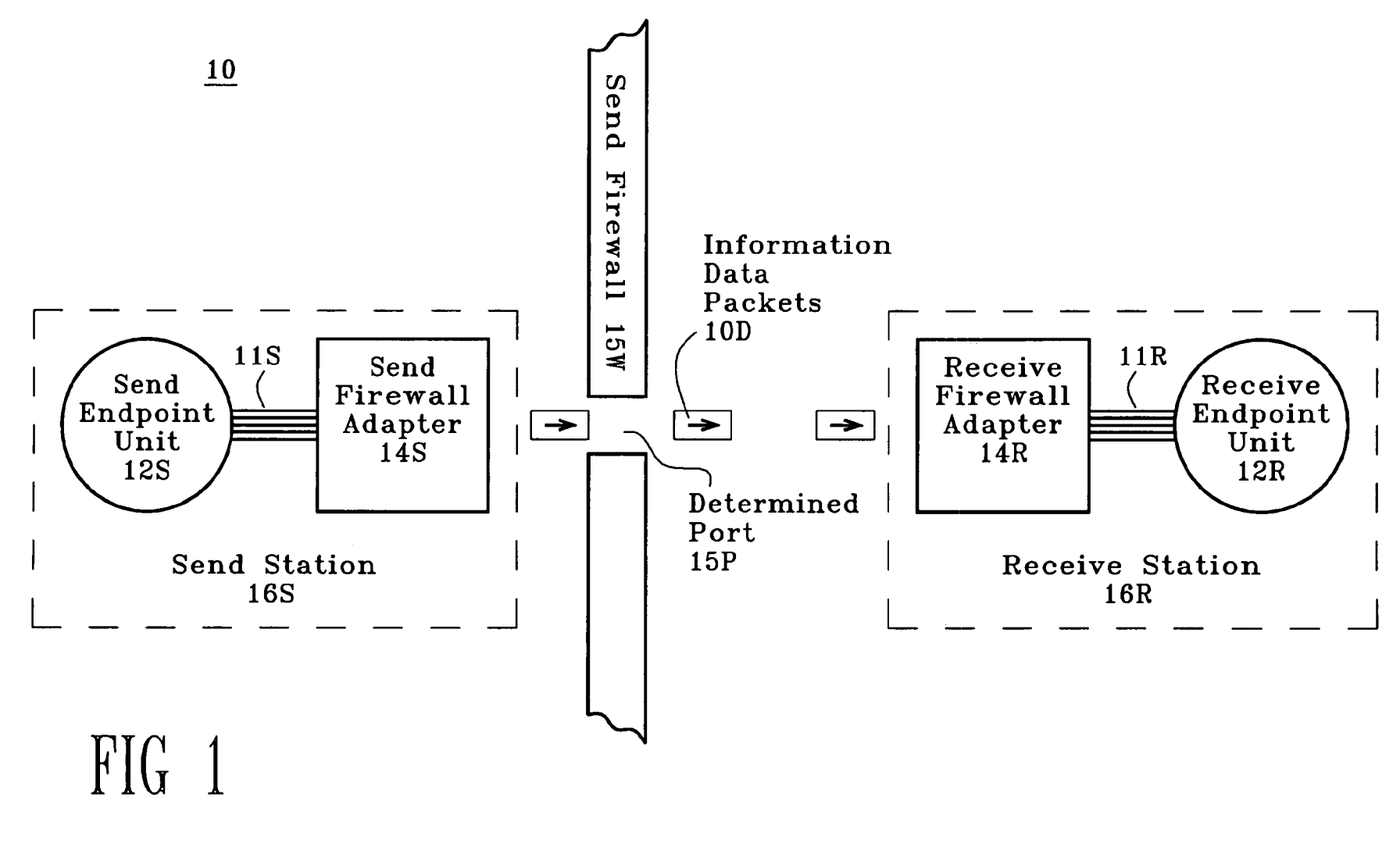
FIG. 1 is a block diagram of simple communication system 10 between send station 14S and receive station 14R, through open port 15P in firewall 15W.

10 Standard Based Communication System 10
10D Data Packets 10D
11S Sending Ports 11S
11R Receiving Ports 11R
12S Sending Endpoint Unit 12S
12R Receiving Endpoint Unit 12R
14S Sending Firewall Adapter 14S
14R Receiving Firewall Adapter 14R
15W Send Firewall 15W
15P Open Port 15P
16S Sending Station 16S
16R Receiving Station 16R
20 Standard Based Communication System 20
20D Data Packets 20D
20N Communication Internet 20N
20M Media Server 20M
22A Endpoint Unit 22A
22B Endpoint Unit 22B
24A Firewall Adapter 24A
24B Firewall Adapter 24B
25A Firewall 25A
25B Firewall 25B
26A Communication Station 26A
26B Communication Station 26B
31 Endpoint Ports 31
32 Endpoint Unit 32
34 Firewall Adapter 34
34C Controller 34C
34D Demultiplexer 34D
34E Endpoint Interface 34E
34M Multiplexer 34M
34S Protocol Stacks 34S
34T Tunnel Interface 34T
35W Firewall 35W
35P Port 35P
40 Communication System 40
44S Firewall Adapter 44S
44T Tunnel Interface 44T
44L Component and Template Library 44L
48R Firewall Adapter 48R
48T Tunnel Interface 48T
48L Component and Template Library 48L
45P Port 45P Standard Based Firewall System (FIG. 1)

System 10 distributes information data packets 10D containing standard configuration headers from multiple send endpoint ports 11S in send endpoint unit 12S; to multiple receive endpoint ports 11R in receive endpoint unit 12R. The packets pass through standard based send firewall adapter 14S (shown in detail in FIG. 3), traverse at least one firewall 15W through selected port 15P, and pass through standard based receive firewall adapter 14R. The firewall adapters are positioned between the endpoint units and the firewall. Standard based system 10 supports firewall friendly communication between send station 16S and receive station 16R, across a communication network such as an internet (shown in FIG. 2).

The endpoint units in the send and receive stations may be simple PCs operated by individuals at a single work station, or a collection of end user PCs and other standard based communication devices. Alternatively, the endpoint units may be complex computer system(s) operated by large organizations. The endpoint units may be autonomous or may require intervention by a human agent.

Figure 2:
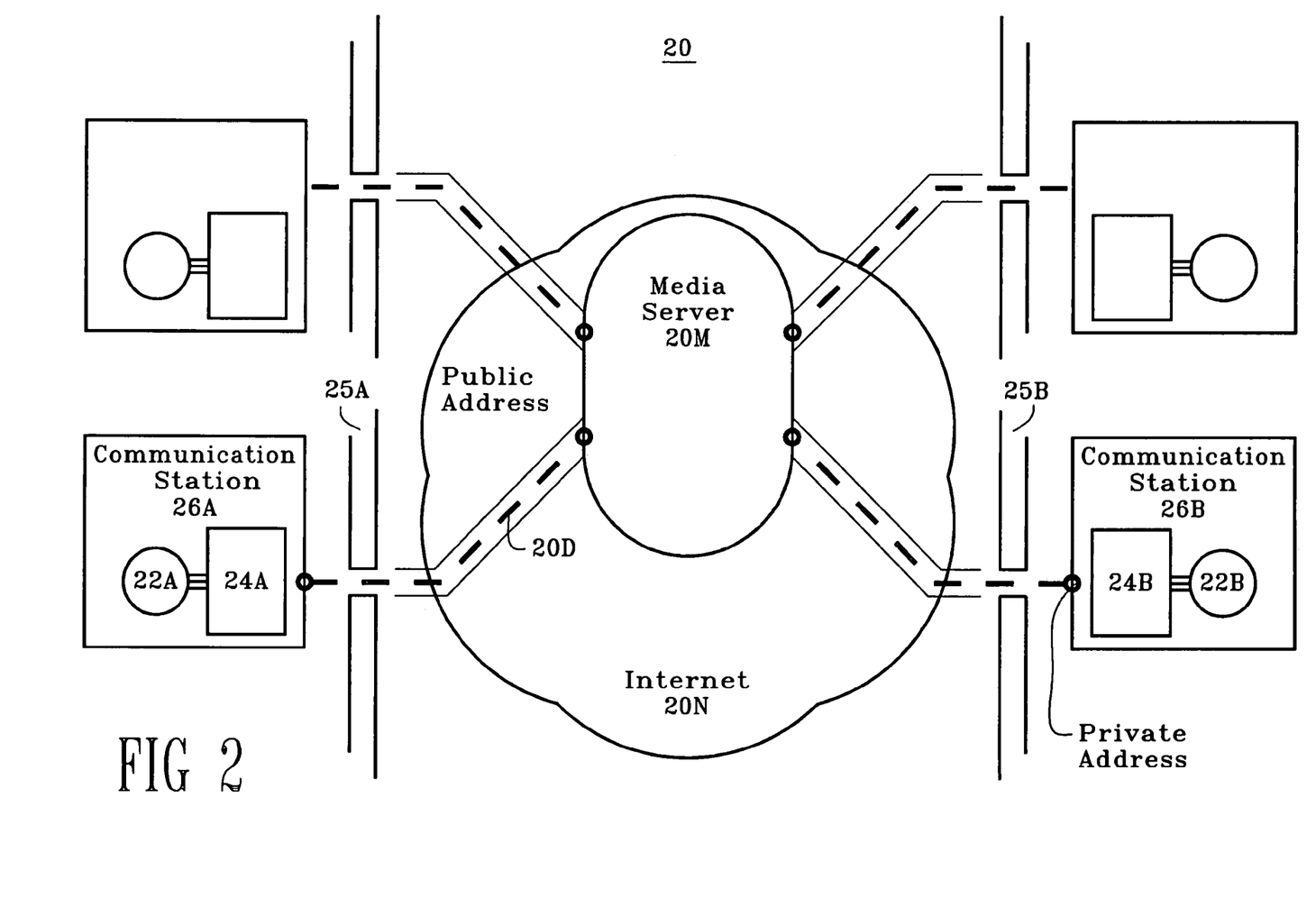
FIG. 2 is a block diagram of complex communication system 20 across communication internet 20N employing a dedicated port between firewall 25A and firewall 25B through media server 20M.

Internet System (FIG. 2)

System 20 distributes information data packets 20D from endpoint unit 22A, to endpoint unit 22B. The packets pass through standard based firewall adapter 24A, traverse firewall 25A, and enter internet 20N. The packets are processed by media server 20M, traverse firewall 25B, and pass through standard based firewall adapter 24B.

The communication network may be an international or global internet providing electronic communication between networks and organizational computer facilities around the world such as communication stations 26A and 26B. In a less complex embodiment, the communication network may be a WAN (wide area network) or a narrower LAN (local area network). A typical LAN is a private network extending throughout a singe building or several building in close proximity. A WAN may connect several LANs.

The internet may contain media servers for providing communication functions such as NAT (network address translations). LANs frequently employ invisible private network addresses instead of regular IP address which are visible for outside access. The send party accesses the visible address at the media server, which routes (translates) the communication to the private address. The media server may be accessed by hundreds of parties simultaneously, each of which may have a firewall with a firewall adapter.

Figure 3:
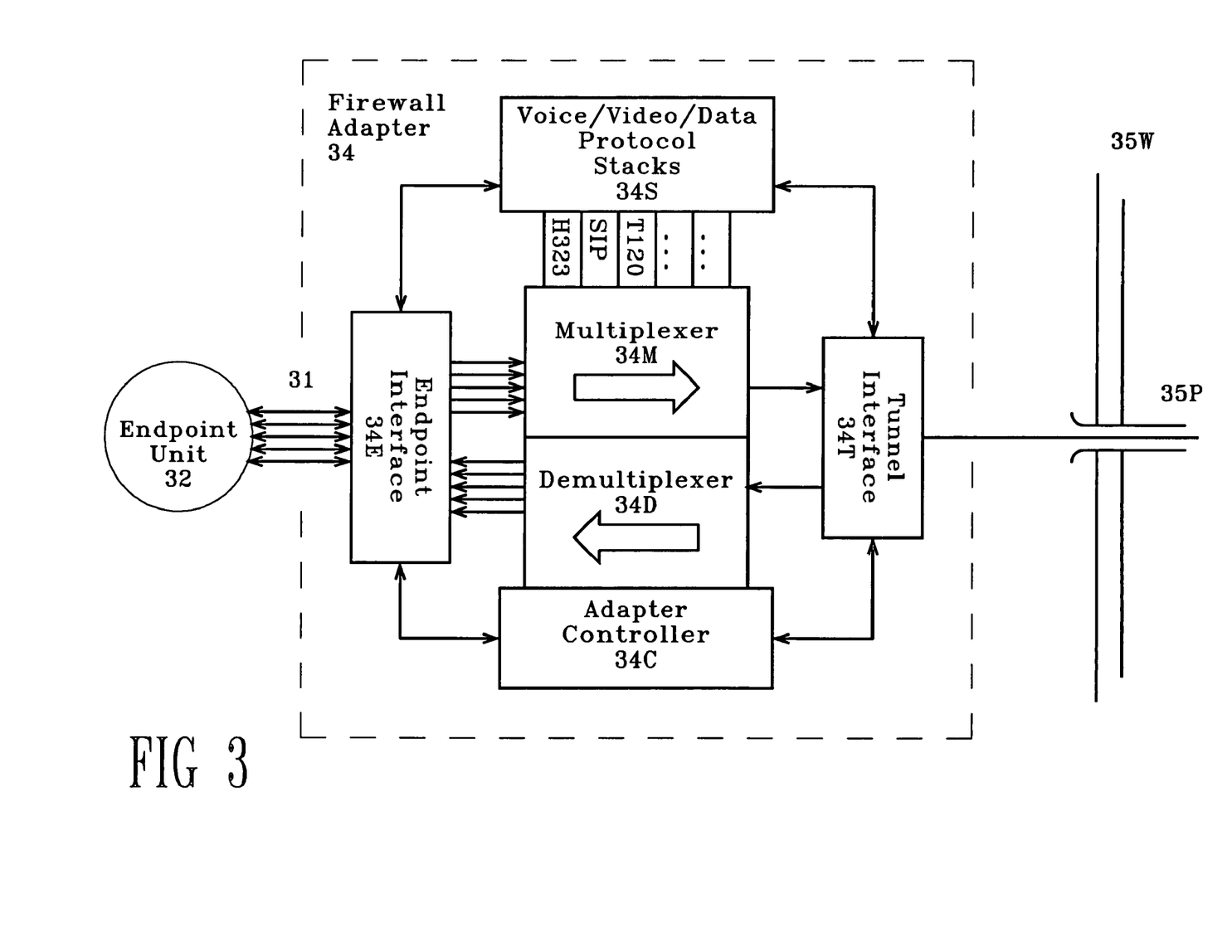
FIG. 3 is a block diagram of firewall adapter 34 showing the primary elements and functions thereof.

Standard Based Firewall Adapter (FIG. 3)

The basic functional elements of firewall adapter 34 are shown in FIG. 3 and described below. The method of operation is described in FIG. 5.

Tunnel Interface 34T attends to technical matters associated with the firewall, the tunnel, and the internet. The tunnel interface opens and closes the tunnel and transports the stream of incoming and outgoing data packets across the internet. The tunnel interface opens multiple logical channels by assigning channel numbers in packet headers.

Adapter Controller 34C coordinates the operation of the adapter, including logging users on/off, conference initiation, and access/security control. The controller also directs communication matters concerning call management such as call waiting, call transfer, call hold, messages, and directory database.

Voice/Video/Data Protocol Stack 34S maintains a suitable inventory of header protocols. These protocols stamp the headers of outgoing packets as part of the creation process, and direct the flow of incoming packets.

Multiplexer 34M reads the header configuration of outgoing packets in multiple streams of packets from multiple send endpoint ports 31 of send endpoint unit 32. The multiplexer provides a single stream of multiplexed packets which traverse firewall 35W through port 35P.

Demultiplexer 34D reads the header configuration of incoming packets in the single stream of received packets which has traversed the firewall from the internet. The demultiplexer provides multiple streams of demultiplexed packets for multiple endpoint ports 31. The headers have destination instructions in the header which direct the multiplexer and demultiplexer. The packets destination may be one or more multiple receive endpoint ports in a receive endpoint unit.

Endpoint Interface Unit 34E manages the voice and video and data (white board) activities of the endpoint unit.

Figure 4:
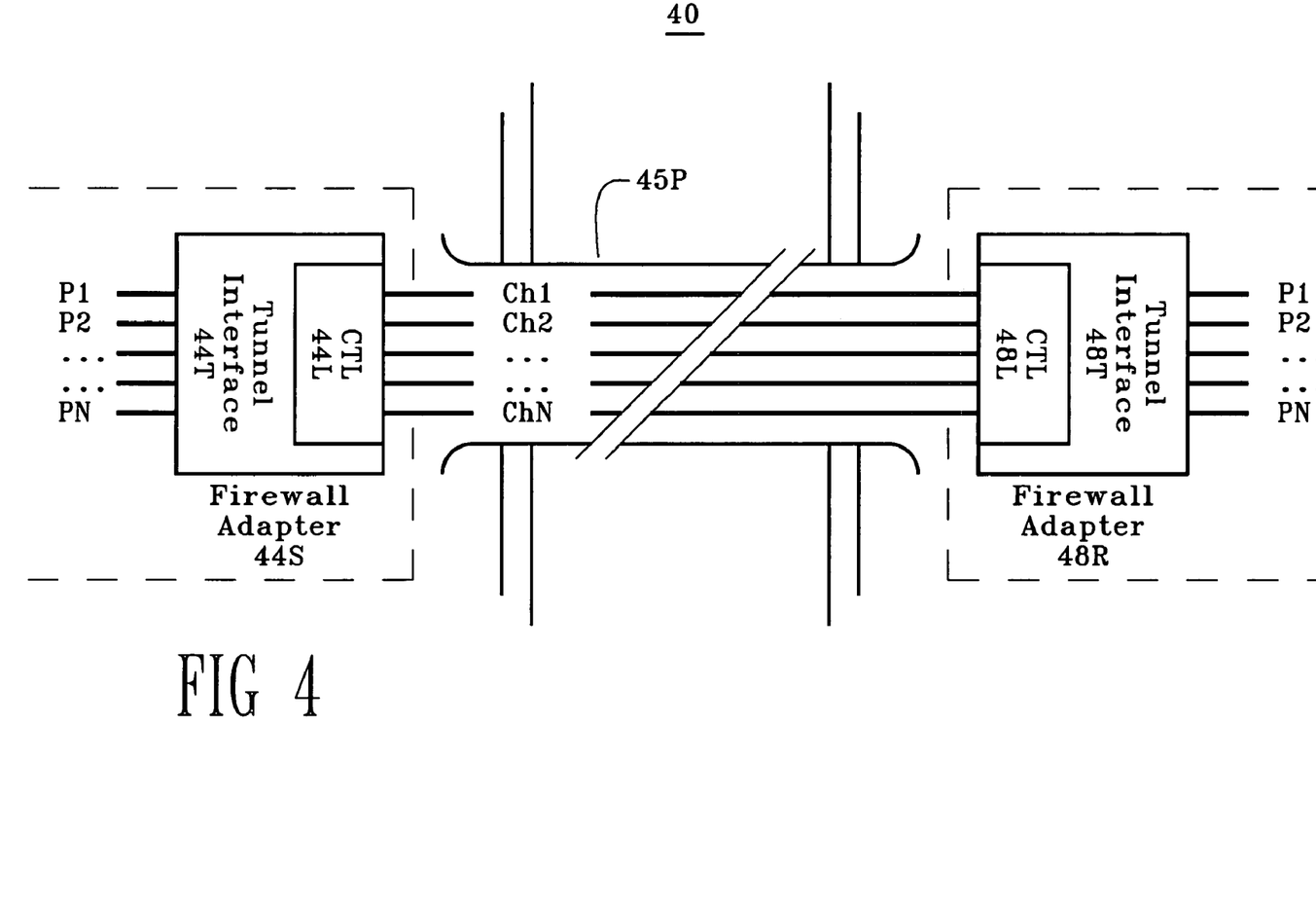
FIG. 4 is a block diagram of communication system 40 employing multiplexed channels Ch1-ChN in network port 45P between firewall adapter 44S and firewall adapter 48R.

Multiple Port/Channel Embodiment (FIG. 4)

System 40 distributes information data packets from multiple send endpoint ports P1, P2, . . . Pn within send firewall adapter 44S, to multiple receive endpoint ports P1, P2, . . . Pn within receive firewall adapter 48R. The data packets enter tunnel interface 44T on the multiple send ports, and leave on multiple corresponding logical channels C1, C2, . . . Cn. The port to channel conversion is effected by CTL (component and template library) 44L within the tunnel interface. CTL 44L assigns a unique channel number to the headers of the outgoing data packets arriving from each send port. All of the assigned channels are tunneled to receive firewall adapter 48R in common network port 45P, which is typically port 80. CTL 48L within tunnel interface 48T reconverts the logical channels back into the original endpoint ports P1, P2, . . . Pn. During connection establishment, CTL 48L directs tunnel interface 48T to assign the original port numbers to the headers of the incoming data packets from each channel.

Figure 5:
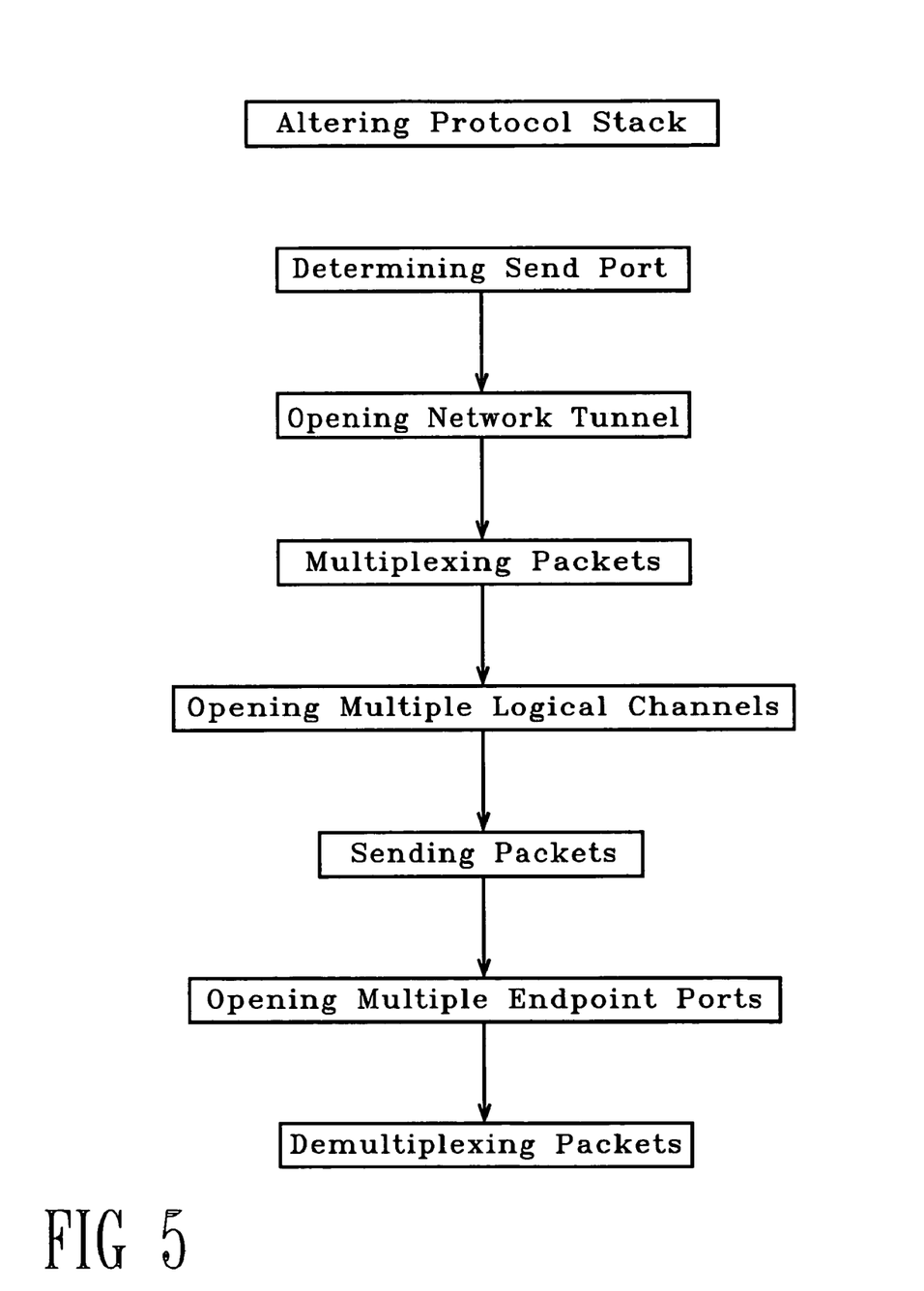
FIG. 5 is a flow chart of the operation of the firewall adapter.

Method Of Firewall Friendly Operation (FIG. 5)

The primary steps of the general method of distributing information packets containing headers over a communication network is shown in the flow chart of FIG. 5 and described below. The apparatus employed in carrying out the method is disclosed in FIGS. 1-4, and in the related detailed descriptions. The packets may originate from one or more multiple send endpoint ports, in a send endpoint unit. The packets pass through a standard based send firewall adapter, across at least one firewall, and through a standard based receive firewall adapter. In the embodiment of FIG. 1, system 10 has a single firewall between the communication network and either the send firewall adapter or the receive firewall adapter. In the embodiment of FIG. 2, system 20 has multiple firewalls between the communication network and the multiple firewall adapters.

Determining a single firewall port through the at least one firewall, from a plurality of firewall ports into the network. This open port may be port 80 which is normally open for public interface. Any other port may be employ as the open port. More than one port may be opened simultaneously to improve communication capacity. However, minimizing the number of open ports reduces the security risk.

Opening a network tunnel connection over the communication network, along determined firewall port, which connection traverses the at least one firewall. Tunneling is bidirectional. The receiving party may transmit send communications to the send party through the same open port in the firewall.

Multiplexing multiple streams of packets in the multiple send endpoint ports of the send endpoint unit, into the single determined firewall port, to form a single stream of multiplexed packets.

Sending the multiplexed packets over communication network through the opened tunnel connection, from the send firewall adapter to the receive firewall adapter.

Demultiplexing the single determined firewall port into the multiple receive endpoint ports of the receive endpoint unit to form multiple streams of demultiplexed packets.

Protocol Stacks

The method of distributing information packets may include the follow additional steps.

Providing a header protocol from a stack of protocols in response to the packet headers.

Altering the protocol stack by adding or deleting specific protocols. The altering is accomplished by entering or erasing codes into the protocol stack (as indicated in FIG. 3). A user may easily update specific installed protocols, or expand the protocol stack inventory to support additional standard based configurations in current use. The user may upgrade the inventory to include any newly created configurations. Alternatively, the user may delete antiquated or unused configurations.

Firewall Port Determination

The determined firewall port may be selected by the send firewall adapter. The determined firewall port may be selected from a range of firewall ports. The determined firewall port may be a predetermined firewall port for supporting customized applications or special protocols. The predetermined port may be a default port such as port 80 in a HTTP (hypertext transfer protocol) application. Port 80 is a standard start/browsing port which carries active linking between pages and text, text coding, and tags for hot links. Overuse of port 80 may crowd the traffic and load the port bandwidth limitations, causing loss of data through "rolloff". The parties may select another port which has less traffic. This selection may be executed automatically by the host computer as traffic density approaches a specified load.

Multiple Ports/Channels

The method of distributing information packets may include the follow additional steps.

Opening multiple logical communication channels before the sending step, corresponding to the multiple send endpoint ports. The channels are opened within the opened tunnel connection by assigning channel numbers in the header of the packets.

Opening multiple receive endpoint Ports after the sending step, corresponding with the multiple logical communication channels. The ports are opened within the receive endpoint unit by assigning port numbers in the header of the packets.

Voice/Video Over TCP Embodiment

Each communication network has a network protocol for distributing information packets, which may include the network protocol TCP for carrying voice and/or video data. The two primary network communication protocols for transporting information packets are UDP (user datagram protocol) and TCP (transport control protocol).

The UDP network protocol does not guarantee the arrival of each information packet and is therefor usually faster than the TCP protocol. UPD does not send back a return acknowledgment message of the arrival of each packet received. If a packet is misrouted due a flawed or misread header, that packet is never received; and neither the receiver or the sender are ever aware of the missing packet. These non-received packets are "lost". Perhaps as many as 5-10% of these UPD packets become lost. The lost packets cause an anomaly or "blip" in the data stream. At low loss levels, audio/visual blimps may be accommodated by the inherent redundancy in voice/video communication. A packet may contain only a syllable, or a fraction of a word, or part of a scanline. Therefore, voice/video is commonly transported by the fast, but imperfect UDP.

TCP, on the other hand, does send a return message acknowledging each packet that has arrived. The sender becomes aware of which packets did not arrive by the absence of return messages; and sends a replacement packet. This non-acknowledgement, resend process continues until all of the packets have been accounted for. Unlike UPD, in TCP a packet is never lost. However, occasionally a resent packet may arrive too late to fit into the real time flow of a voice/video communication stream. The header configurations in each packet are serialized by time stamping to define a coherent data stream from the sender. When the packets are reassembled into this data stream by the receiver, some of the resent packets may not have arrived yet. These resent TCP packets are not lost, they are simply delayed and no longer useable. Such out-of-order tardiness is rare in TCP. Voice/video information sent by TCP is of higher quality than UPD.

INDUSTRIAL APPLICABILITY

It will be apparent to those skilled in the art that the objects of this invention have been achieved as described hereinbefore. Various changes may be made in the structure and embodiments shown herein without departing from the concept of the invention. Further, features of embodiments shown in various figures may be employed in combination with embodiments shown in other figures. In addition, the features of this invention may be incorporated into a suitable computer readable media which stores computer instructions for causing a computer to execute the steps of the invention.

Therefore, the scope of the invention is to be determined by the terminology of the following claims and the legal equivalents thereof.

We claim:

1. A method of distributing voice, video and data information packets containing headers over a communication network, from multiple send endpoint ports, in a send endpoint unit, through a standard based send firewall adapter, across at least one firewall, through a standard based receive firewall adapter, to multiple receive endpoint ports in a receive endpoint unit, wherein the firewall adapter is used with a customized port, comprising the steps of:
    determining a single firewall port through the at least one firewall, from a plurality of firewall ports into the network;
    opening a network tunnel connection over the communication network, along determined firewall port, which connection traverses the at least one firewall;
    multiplexing multiple streams of packets in the multiple send endpoint ports of the send endpoint unit, into the single determined firewall port, to form a single stream of multiplexed packets;
    sending the multiplexed packets over communication network through the opened tunnel connection, from the send firewall adapter to the receive firewall adapter; and
    demultiplexing the single determined firewall port into the multiple receive endpoint ports of the receive endpoint unit to form multiple streams of demultiplexed packets.

2. The method of claim 1, further comprising before the sending step the additional step of providing a header protocol from a stack of protocols in response to the packet headers.

3. The method of claim 2, further comprising the additional step of altering the protocol stack by adding or deleting specific protocols.

4. The method of claim 1, wherein the at least one firewall is
    a single firewall between the communication network and either the send firewall adapter or the receive firewall adapter.

5. The method of claim 1, wherein the at least one firewall is at least two firewalls,
    a send firewall between the communication network and the send firewall adapter and
    a receive firewall between the communication network and the receive firewall adapter.

6. The method of claim 1, wherein the communication network has a network protocol for distributing information packets.

7. The method of claim 6, wherein the network protocol is TCP.

8. The method of claim 7, wherein the communication is carried by voice and/or video.

9. The method of claim 6, wherein the communication network is an internet.

10. The method of claim 6, wherein the communication network is a wide area network.

11. The method of claim 6, wherein the communication network is a local area network.

12. The method of claim 1, wherein the determined firewall port is selected by the send firewall adapter.

13. The method of claim 1, wherein the determined firewall port is selected from a range of firewall ports.

14. The method of claim 1, wherein the determined firewall port is predetermined.

15. The method of claim 14, wherein the predetermined firewall port is a default port.

16. The method of claim 15, wherein the predetermined default firewall port is the HTTP network port.

17. The method of claim 1, further comprising before the sending step the additional step of opening multiple logical communication channels within the opened tunnel connection by assigning channel numbers in the header of the packets, the multiple channels corresponding to the multiple send endpoint ports.

18. The method of claim 17, further comprising after the sending step the additional step of opening multiple receive endpoint ports within the receive endpoint unit by assigning port numbers in the header of the packets, the multiple receive endpoint ports corresponding with the multiple logical communication channels.

19. Apparatus for distributing voice, video and data information packets containing headers over a communication network, from multiple send endpoint ports, in a send endpoint unit, through a standard based send firewall adapter, across at least one firewall, through a standard based receive firewall adapter, to multiple receive endpoint ports in a receive endpoint unit, wherein the firewall adapter is used with a customized port, comprising:
    means for determining a single firewall port through the at least one firewall, from a plurality of firewall ports into the network;
    means for opening a network tunnel connection over the communication network, along determined firewall port, which connection traverses the at least one firewall;
    means for multiplexing multiple streams of packets in the multiple send endpoint ports of the send endpoint unit, into the single determined firewall port, to form a single stream of multiplexed packets;

means for sending the multiplexed packets over communication network through the opened tunnel connection, from the send firewall adapter to the receive firewall adapter; and means for demultiplexing the single determined firewall port into the multiple receive endpoint ports of the receive endpoint unit to form multiple streams of demultiplexed packets.

20. A computer readable media for storing computer instructions which cause a computer to distribute voice, video and data information packets containing headers over a communication network, from multiple send endpoint ports, in a send endpoint unit, through a standard based send firewall adapter, across at least one firewall, through a standard based receive firewall adapter, to multiple receive endpoint ports in a receive endpoint unit, wherein the firewall adapter is used with a customized port, by executing the steps of;

determining a single firewall port through the at least one firewall, from a plurality of firewall ports into the network;

opening a network tunnel connection over the communication network, along determined firewall port, which connection traverses the at least one firewall;

multiplexing multiple streams of packets in the multiple send endpoint ports of the send endpoint unit, into the single determined firewall port, to form a single stream of multiplexed packets;

sending the multiplexed packets over communication network through the opened tunnel connection, from the send firewall adapter to the receive firewall adapter; and demultiplexing the single determined firewall port into the multiple receive endpoint ports of the receive endpoint unit to form multiple streams of demultiplexed packets.

* * * * *

UNITED STATES PATENT AND TRADEMARK OFFICE
CERTIFICATE OF CORRECTION

PATENT NO. : 7,360,243 B2  Page 1 of 2
APPLICATION NO. : 10/676174
DATED : April 15, 2008
INVENTOR(S) : Nenad Krtolica et al.

It is certified that error appears in the above-identified patent and that said Letters Patent is hereby corrected as shown below:

In the Specification:

Column 1, line 47, delete "videos" and replace with --video--; line 56, delete "were be" and replace with --is--; line 57, insert --the-- before the word "first".

Column 2, line 9, delete "firewalls;" and replace with --firewalls.--; line 31, delete the second occurrence of "adapter" and replace with --adapters--.

Column 4, line 34, delete "singe" and replace with --single--; line 34, delete the second occurrence of "building" and replace with --buildings--.

Column 5, line 1, delete "packets" and replace with --packets'--; line 47, delete "employ" and replace with --employed--.

Column 6, line 3, delete "follow" and replace with --following--; line 36, delete "follow" and replace with --following--; line 42, delete "Ports" and replace with --ports--; line 58, delete "UPD" and replace with --UDP--; line 64, delete "UPD" and replace with --UDP--; line 66, delete "blimps" and replace with --blips--.

Column 7, line 9, delete "UPD" and replace with --UDP--; line 20, delete "UPD" and replace with --UDP--.

In the Claims:

Claim 1, column 7, line 57, insert --the-- after the word "over".

Claim 8, column 8, line 20, delete "the" and replace with --a--.

Claim 16, column 8, line 37, delete "the" and replace with --an--.

Claim 18, column 8, line 47, delete "header" and replace with --headers--.

Signed and Sealed this

Eighteenth Day of May, 2010

David J. Kappos
*Director of the United States Patent and Trademark Office*

Claim 19, column 8, line 50, delete "Apparatus" and replace with --An apparatus--; column 9, line 3, insert --the-- after the word "over".

Claim 20, column 9, line 11, delete "media" and replace with --medium--; column 9, line 20, delete "of;" and replace with --of:--; column 10, line 11, insert --the-- after the word "over".